US012769404B2

(12) United States Patent
Wang et al.

(10) Patent No.: US 12,769,404 B2
(45) Date of Patent: Oct. 20, 2026

(54) POINTING DEVICE INTERACTION VIA VIBRATION

(71) Applicant: Dell Products L.P., Round Rock, TX (US)

(72) Inventors: Kai Wang, Shanghai (CN); Jimmy L. Griffith, Pflugerville, TX (US); David Allen Dyson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 9 days.

(21) Appl. No.: 18/928,249

(22) Filed: Oct. 28, 2024

(65) Prior Publication Data

US 2026/0147417 A1 May 28, 2026

(51) Int. Cl.
*G06F 3/01* (2006.01)
*G06F 3/0354* (2013.01)

(52) U.S. Cl.
CPC .............. *G06F 3/017* (2013.01); *G06F 3/016* (2013.01); *G06F 3/03543* (2013.01); *G06F 3/03545* (2013.01); *G06F 3/03547* (2013.01)

(58) Field of Classification Search
CPC ...... G06F 3/017; G06F 3/016; G06F 3/03543; G06F 3/03545; G06F 3/03547
See application file for complete search history.

(56) References Cited

U.S. PATENT DOCUMENTS

| | | | | |
|---|---|---|---|---|
| 5,990,866 A * | 11/1999 | Yollin | G06F 3/03545 345/157 |
| 2005/0078093 A1* | 4/2005 | Peterson, Jr. | G06F 3/043 345/173 |
| 2010/0245246 A1* | 9/2010 | Rosenfeld | G06F 3/0383 345/163 |
| 2014/0075458 A1* | 3/2014 | Wright | G06F 9/451 719/321 |
| 2014/0123079 A1* | 5/2014 | Wu | G06F 3/017 715/863 |
| 2014/0146021 A1* | 5/2014 | Trethewey | G06F 3/0346 345/179 |
| 2021/0022490 A1* | 1/2021 | Averianov | A47B 21/007 |

FOREIGN PATENT DOCUMENTS

KR 20230070827 A * 5/2023 ............. G06F 3/038

OTHER PUBLICATIONS

Machine translation of KR 10-2023-0070827 (Year: 2023).*
Diego Martinez, "Back Tap iPhone Feature: Explained," Jul. 13, 2024, publisher SimplyMac, downloaded Sep. 23, 2024, available at https://www.simplymac.com/iphone/back-tap-iphone.
(Continued)

*Primary Examiner* — Patrick N Edouard
*Assistant Examiner* — Joseph P Fox
(74) *Attorney, Agent, or Firm* — Fogarty LLP

(57) ABSTRACT

A pointing device, such as a mouse, a touchpad, or an active pen, may include a piezoelectric vibration sensor, which may facilitate the addition of other user gestures. A knock gesture may cause a vibration of the piezoelectric vibration sensor, where that vibration may be used to recognize the knock gesture. The knock gesture may be programmatically associated with actions of an information handling system.

20 Claims, 8 Drawing Sheets

(56) References Cited

OTHER PUBLICATIONS

"Huawei's P20 Series Debuts With Qeexo's FingerSense Technology," Huawei's P20 Series Debuts With Qeexo's FingerSense, Apr. 2, 2018, downloaded Sep. 23, 2024, available at https://www.globenewswire.com/news-release/2018/04/02/1458642/0/en/Huawei-s-P20-Series-Debuts-With-Qeexo-s-FingerSense-Technology.html.
J. Angelo Racoma, "Qeexo FingerSense: When taps and swipes are not enough," Jun. 15, 2014, 4 pages, publisher Android Authority.

* cited by examiner

POINTING DEVICE INTERACTION VIA VIBRATION

FIELD

This disclosure relates generally to Information Handling Systems (IHSs), and more specifically, to systems and methods for pointing device interaction via vibration.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

According to one embodiment, a method includes: controlling a cursor on a computer screen according to movement of a pointing device; analyzing data from the pointing device, wherein the data indicates voltage levels over a time window; by the analysis, determining that the data corresponds to a vibration having multiple peaks that exceed an amplitude threshold; in response to determining that the data corresponds to the vibration, determining that a user interaction with the pointing device is a knock gesture; and performing an action on an information handling system (IHS) in response to the user interaction.

According to one embodiment, an Information Handling System (IHS), includes: a processor; and a memory coupled to the processor, the memory having program instructions stored thereon that, upon execution by the processor, cause the IHS to: translate data from a piezoelectric device into an indication of a user gesture with a pointing device, wherein the data provides an indication of a voltage level over a time range, and wherein the user gesture includes knocking the pointing device; and perform an action on a display screen of the IHS in response to the user gesture.

According to one embodiment, a hardware memory device having program instructions stored thereon that, upon execution by a processor of an Information Handling System (IHS), cause the IHS to: detect a user knock gesture based on data from a piezoelectric device incorporated into a pointing device, including determining the user knock gesture from an indication of voltage levels over a time window in the data; and control a display on a graphical user interface in response to the user knock gesture.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
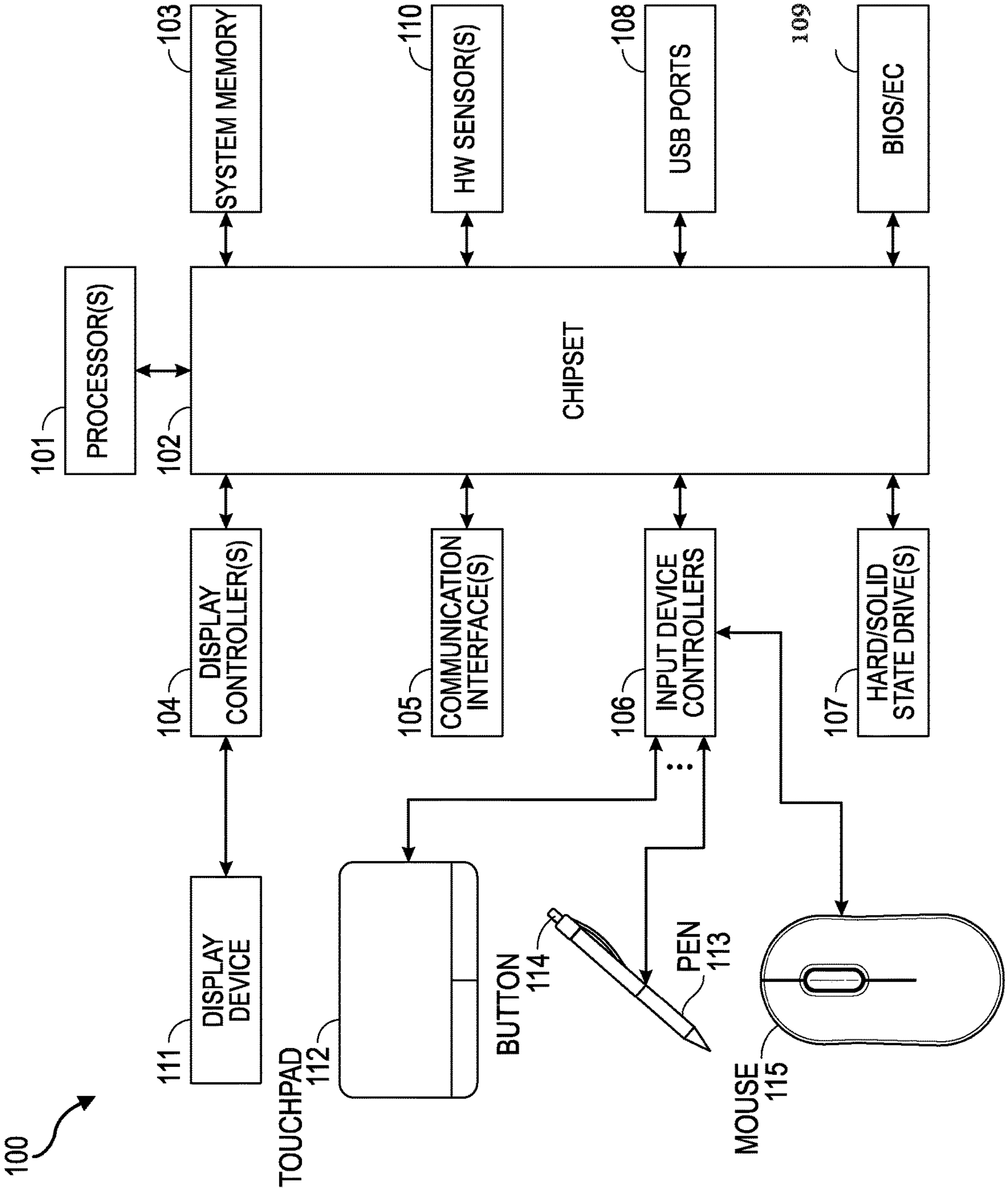
FIG. 1 is a block diagram of components of an example Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. It should be appreciated that although certain embodiments are discussed in the context of a personal computing device, other embodiments may utilize various other types of IHSs.

Various embodiments include a piezoelectric device in a pointing device to provide additional functionality over that offered by current pointing devices. Examples of pointing devices may include mouses, touchpads, trackball devices, active pens, and the like.

The piezoelectric device may be disposed within, or coupled to, the pointing device and configured as a vibration sensor as well as a vibration-inducing transducer. When the piezoelectric device is configured as a vibration sensor, it may add further modes of input to the pointing device. For instance, an additional gesture, referred to herein as a knock, may be used by a human user to control actions with respect to a graphical user interface (GUI).

One example embodiment may include a piezoelectric device disposed within a plastic housing of a mouse device. The piezoelectric device, when operating in vibration sensor mode, may react to physical disturbance or motion by vibrating, and those vibrations may be turned into electric signals by the piezoelectric device. For instance, vibration may normally be caused by a user moving the mouse around on a flat surface (e.g., translational motion), and vibration may also be caused by a click of a button on the mouse.

Furthermore, a knock gesture may be identified by software or firmware functionality analyzing the vibration to either positively identify the knock gesture and/or identify the knock gesture by eliminating translational motion and button clicking.

In one example, the output of the mouse includes a digital signal that indicates a voltage level associated with vibration of a piezoelectric membrane. A larger amplitude of peaks of the voltage may indicate a larger amplitude of the vibration and, thus, a larger amount of energy applied to the mouse. Normal operation of the mouse may include translational motion over a flat surface, which may generate relatively small vibrations and relatively small voltage levels, button clicking of the mouse may generate relatively larger vibrations and relatively larger voltage levels, whereas a knock gesture may be expected to generate even larger vibrations and even larger voltage levels than either translational motion or button clicking.

A knock gesture may be identified by a relatively large amplitude, for instance, of peaks in detected voltage, where the level of the detected voltage reaches or exceeds a threshold and wherein a quantity of the relatively large peaks occur within a pre-configured window of time. In some implementations, a knock gesture may be identified by analyzing the output of the piezoelectric device and matching an analysis of the output to one or more profiles of a knock gesture. Also, some implementations may use machine learning (ML) by training and ML model on various knock gestures to create one or more profiles to recognize knock gestures.

Additionally, the piezoelectric device in the pointing device may be used as a vibration inducing transducer. Such transducer may be employed to provide haptic feedback.

Various embodiments may provide advantages over other systems. One potential advantage may include the addition of modes of input, thereby allowing a pointing device, such as a mouse, to be able to interact in additional ways. Put another way, the additional modes of input may make a pointing device more useful for some users. In another aspect, a piezoelectric device may be relatively inexpensive and relatively small, thereby allowing for its use in various pointing devices, such as a mouse, a touchpad, an active pen, and/or the like. By contrast, an accelerometer may be able to be used to detect some forms of movement, but an accelerometer may be relatively expensive and thus prohibitive for use in some pointing devices in which cost may be a factor. Furthermore, a piezoelectric device may also be generally expected to use less power than would an accelerometer.

The terms "touchpad," "trackpad," and "clickpad," as used herein, generally refer to a pointing device featuring a touch sensor having a specialized surface that translates motion and position detected thereon into a relative or absolute position usable by an Operating System (OS) of an IHS to render an image (e.g., an arrow, a cursor, etc.) on a display.

In various implementations, a touchpad may be a capacitive touchpad. A capacitive touchpad produces an electrostatic field that is disrupted when touched (e.g., by an object that draws some electrical charge). Particularly, a capacitive touchpad detects a reduction of its capacitance and uses that to determine when, where, and/or by how much (e.g., pressure) it is being touched. In some cases, a touchpad may also be capable of identifying hovering of an object (e.g., a finger or pen) above its surface, as well as a height of the hovering (e.g., a vertical distance between an object and the touchpad. Additionally, or alternately, a touchpad may include a digitizer under its (non-display or opaque) surface.

A mouse may include an electronic pointing device that detects user translational movement and turns the movement into a relative position and speed of a cursor on a display device. A trackball device may include a ball that is configured to be manipulated by a user (e.g., by a user's thumb or pointer finger), detects the manipulation, and turns the manipulation into a relative position and speed of a cursor on a display device. A mouse or trackball device may also include one or more buttons, which may be pressed to indicate selection or to cause a menu to render.

The terms "pen" or "stylus," as used herein, generally refer to a cylindrical object, conventionally used with touch-screen-enabled devices (e.g., tablet IHSs, to navigate a Graphical User Interface or "GUI," send messages, etc.), but which in various embodiments described herein may be further usable in conjunction with a touchpad as pointing device for handwriting and/or for drawing, for example, during a collaboration session using one or more writing or drawing tools (e.g., lines, brushes, sprays, patterns, colors, shapes, etc.).

A passive or capacitive pen is a pen that behaves like a human finger when touching a touchpad. In contrast, an active pen includes electronic components that communicate with the touchpad. Active pens may be used for, example, for note taking, on-screen drawing/painting, electronic document annotation, signatures, etc. In some cases, when either type of pen is used, the touchpad may enable or change its palm rejection settings or parameters to accommodate a user's hand holding the pen while responding only to pen inputs.

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BLUETOOTH, cellular or mobile networks (e.g., CDMA, TDMA, LTE, etc.), satellite networks, or the like. In some cases, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controller or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, twodimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more Universal Serial Bus (USB) ports 108.

Chipset 102 may further provide access to input device controllers 106, for example, a super I/O controller, firmware or software functionality, or the like. Examples of user input devices which may be communicatively coupled to input device controllers 106 include, but are not limited to, a keyboard, mouse 115, touchpad 112, stylus or pen 113 (with button or switch 114), totem, etc. Input device controllers 106 may represent multiple controllers, such that each of the user input devices may correspond to a respective controller (e.g., a touchpad may have its own touchpad controller). Each of the input devices may interface with its respective controller 106 through a wired or wireless connection (e.g., via communication interfaces(s) 105).

Furthermore, in this example, each of the touchpad 112, pen 113, and/or mouse 115 may include a piezoelectric device, and such piezoelectric device may be operated in a vibration sensing mode or a vibration inducing mode. In a vibration sensing mode, the touchpad 112, the pen 113, and/or the mouse 115 may be configured to detect additional user gestures, such as a knock. When in a vibration inducing mode, the touchpad 112, the pen 113, and/or the mouse 115 may be configured to provide haptic feedback to a user by causing vibration.

In certain embodiments, chipset 102 may also provide an interface for communications with one or more hardware sensors 110. Sensors 110 may be disposed on or within the chassis of IHS 100, and may include, but are not limited to: electric, magnetic, radio, optical, infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. The BIOS provides an abstraction layer that allows the OS to interface with certain hardware components that are utilized by IHS 100. Via the hardware abstraction layer provided by the BIOS, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, etc.

Figure 2:
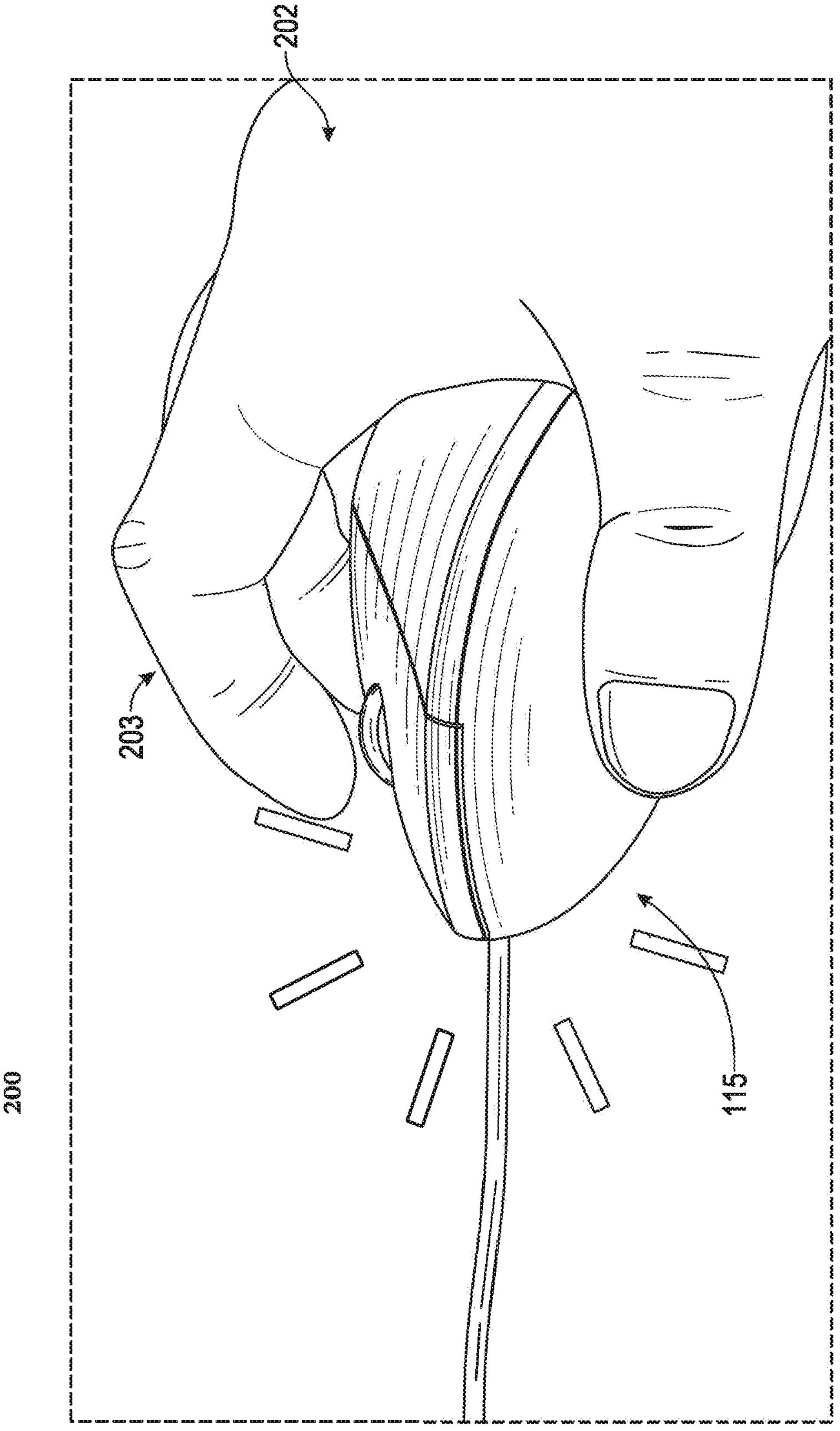
FIG. 2 is an illustration of an example knock gesture, according to some embodiments.

FIG. 2 is an illustration of an example knock gesture 200, according to some embodiments. In the example of FIG. 2, the knock gesture 200 is performed on a mouse 115 by a human hand 202.

More specifically, the human user may make a relatively forceful tap, using pointer finger 203, on an outer housing of the mouse 115. Rather than maintain pressure on the outer housing of the mouse 115, the human user may make the tap relatively brief (e.g., less than ⅛ of a second or so) and relatively forceful. For instance, the force of the tap may be more forceful than the user would employ to depress a button of the mouse 115, to move the scroll wheel of the mouse 115, or to move the mouse 115 across a flat surface.

In another example, the user may use hand 202 to briefly move the mouse 115 in an upward direction so that there is a gap between the mouse 115 and the surface below the mouse and then smack the mouse 115 onto the surface. In other words, the tap 200 may include smacking or clapping the mouse 115 against the surface.

Figure 3:
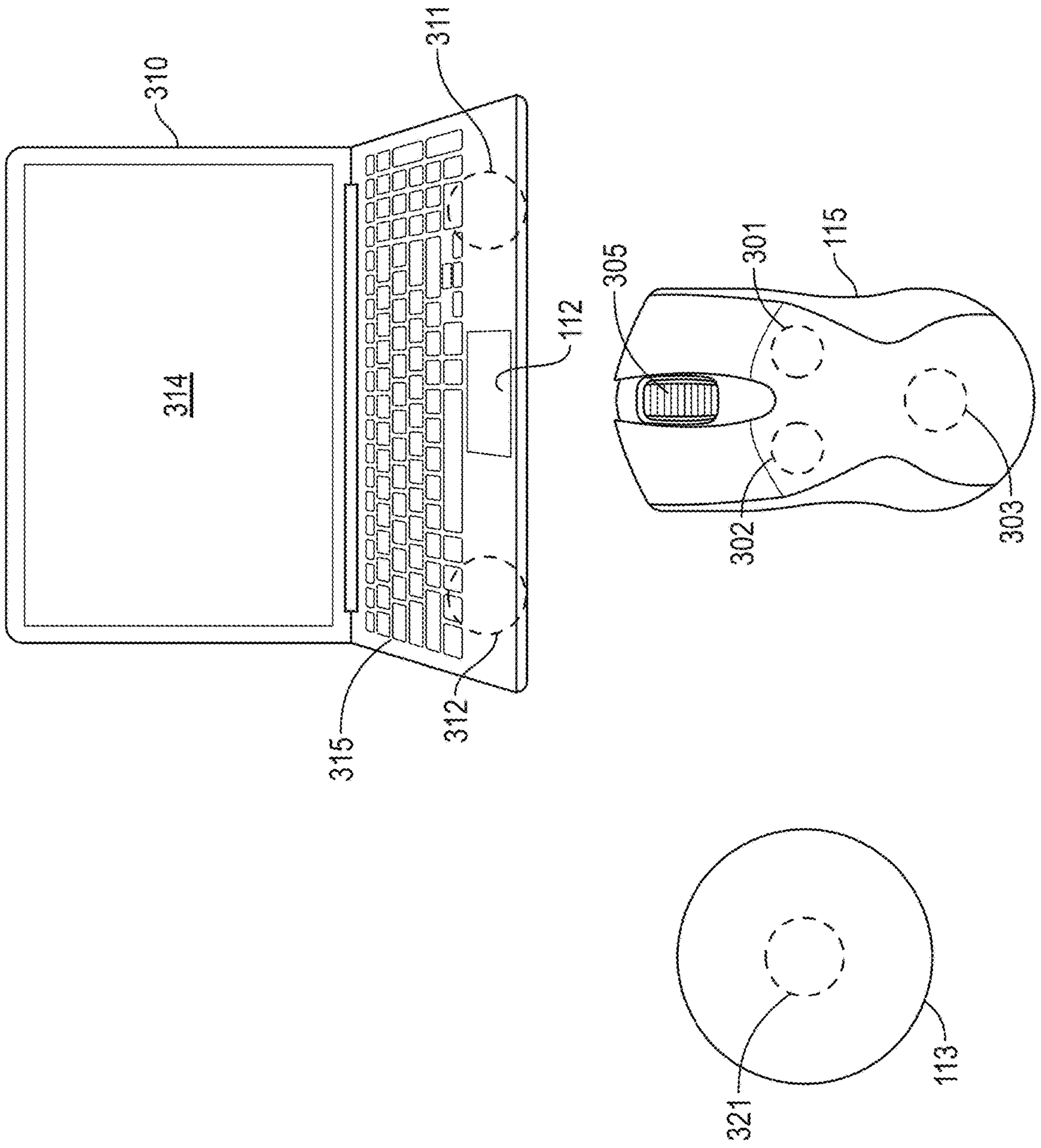
FIG. 3 illustrates an example mouse from a top-down view, according to some embodiments.

Mouse 115 may be configured to include one or more piezoelectric devices. FIG. 3 is an illustration of various techniques for including a piezoelectric device in a pointing device, according to some embodiments.

FIG. 3 illustrates example mouse 115 from a top-down view. It is understood that the top-down view is a view of an outer housing of mouse 115, where that outer housing may be made of plastic or other suitable material. The insides of mouse 115 are not visible. In one example, piezoelectric device 301 may be disposed in the mouse 115 underneath the outer housing and in an area between the tracking wheel 305 and a right-hand side of the mouse 115. For a right-handed user, the location of the piezoelectric device 301 would be below the user's ring finger or pinky finger (or perhaps even middle finger) when grasping mouse 115. In an implementation in which mouse 115 includes a right button and a left button, the piezoelectric device 301 may be placed underneath or nearly underneath the housing of the mouse 115 near the location of the hardware of the left button. In one example, the piezoelectric device 301 may be mounted to the outer housing of the mouse 115, though other implementations may include mounting piezoelectric device 301 to an internal component (not shown) of the mouse 115 or to another appropriate physical object within mouse 115.

Piezoelectric device 302 may be placed similarly to piezoelectric device 301, though symmetrical about an axis that splits the right button and left button.

Piezoelectric device 303 may be placed within mouse 115 in an area associated with a user's thumb palm and away from the left button and right button. Once again, piezoelectric device 303 may be placed within mouse according to any appropriate technique, such as being mounted on an underside of the external housing or mounted to an internal component.

Mouse 115 may include any one, any two, or all three of piezoelectric devices 301-303*m* (or more). Furthermore, the scope of implementations is not limited to the specific locations shown in FIG. 3, as other implementations may place a different quantity of piezoelectric devices in different locations within mouse 115.

Laptop 310 may be configured as an IHS, such as discussed above with respect to FIG. 1. Laptop 310 may also be implemented to include one or more piezoelectric devices 311 and 312. Laptop 310 is shown as being in an open position, with display screen 314 opened up in a clamshell fashion from keyboard 315, thereby allowing a human user to access the keys of keyboard 315 as well as the touchpad 112. The keyboard 315 and the touchpad 112 are implemented in the lower portion of the laptop 310. The piezoelectric device 311 may be implemented within or next to the touchpad 112. For instance, the piezoelectric device 311 may be mounted underneath an outer housing of the keyboard 315, so that it is underneath plastic or metal or some other appropriate material and either overlapping with the area of touchpad 112 or just to the right of touchpad 112.

Similarly, piezoelectric device 312 may be mounted underneath the outer housing of the keyboard 315 and either overlapping with the area of touchpad 112 or just to the left of touchpad 112. If a user desires to make a knock gesture on either of piezoelectric devices 311 or 312, the user may make a relatively forceful tap similar to the relatively forceful tap described above that may be made with respect to the mouse 115.

Of course, the scope of implementations may include any appropriate quantity of piezoelectric devices mounted in any appropriate location or locations of laptop 310.

Pen 113 may be configured as an active pen having piezoelectric device 321 positioned inside. The view in FIG. 3 of pen 113 is a view looking into the cylindrical shape of pen 113, where a circular shape of piezoelectric device 321 may be concentric or approximately concentric with the cylindrical shape of pen 113. However, the scope of implementations may include any appropriate placement of piezoelectric device 321 within pen 113.

A user may make a knock gesture using pen 113 in any appropriate manner. For instance, the user may tap a point of the pen 113 onto a surface, may tap the pen at either end on a surface, and/or the like.

Furthermore, in some examples, the mouse 115 and/or the pen 113 may be communicatively coupled to laptop 310 and used with laptop 310.

Figure 4:
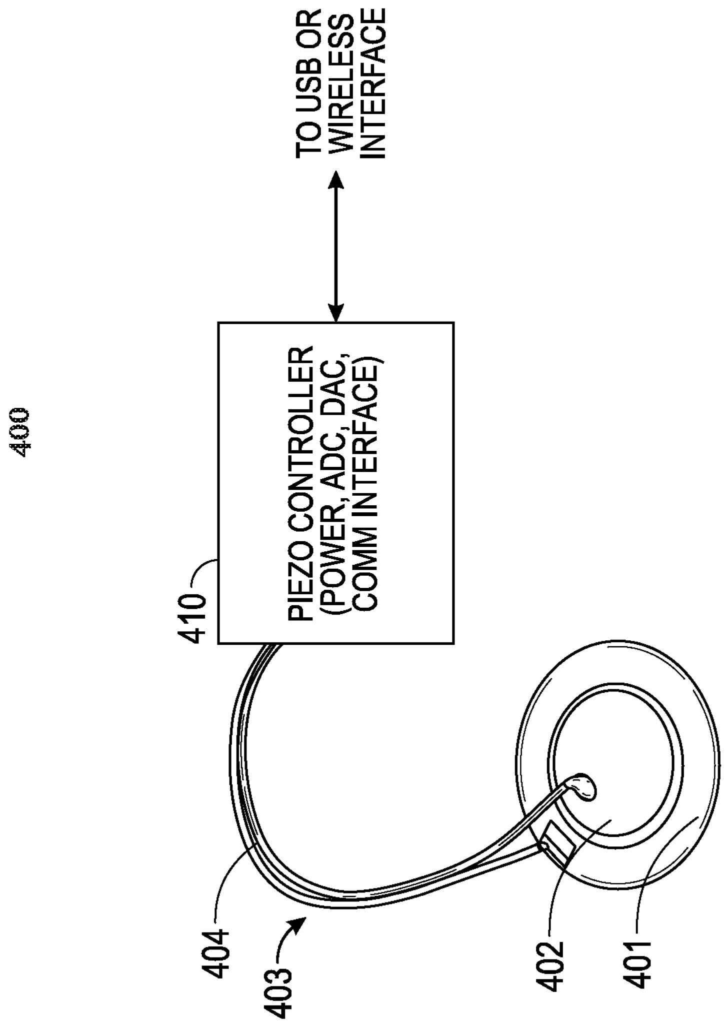
FIG. 4 is an illustration of an example piezoelectric device, according to some embodiments.

FIG. 4 is an illustration of an example piezoelectric device 400, according to some embodiments. Piezoelectric device 400 is an example of a device that may be implemented as any of the piezoelectric devices discussed above with respect to FIGS. 1-3. Furthermore, the circular shapes illustrated in FIG. 3 may correspond to the circular shape of the items 401 and 402 in FIG. 4.

Piezoelectric device 400 in this example is configured to operate as a vibration sensor as well as a vibration inducing transducer. Piezoelectric device 400 includes annular or circular materials 401, 402, which may include ceramic or other appropriate materials. Examples of appropriate materials may include some ceramics, though the scope of implementations may include any appropriate material. The materials 401, 402 may experience vibration from mechanical forces (e.g., such as being knocked) and that vibration may result in a voltage that is conducted over wires 403 and 404.

Piezo controller 410 is responsible for power, analog-to-digital conversion, digital to analog conversion, and interfacing with a communication component (e.g., Universal serial bus—USB or wireless interface). Piezo controller 410 is coupled to the materials 401, 402 by the wires 403, 404 and is thus configured to sense a voltage that is produced by mechanical vibration of the materials 401, 402. For instance, the voltage over the wires 403, 404 may be fed to an analog-to-digital converter (ADC) in the Piezo controller 410, where that ADC may generate a digital output. An example digital output may include binary bits, arranged as appropriately-sized bytes, and representing an amplitude of the voltage across the wires 403 and 404, at least for a particular time slice. In one example, a particular time slice may represent a millisecond, microsecond, or other appropriate time. The Piezo controller 410 may then transfer the digital data to the USB or wireless interface. This is an example of the Piezo controller 410 facilitating use of the piezoelectric device 400 as a vibration sensor.

When acting as a vibration inducing transducer, the piezoelectric device 400 may receive communications over the USB or wireless interface to the Piezo controller 410. For instance, the Piezo controller 410 may receive digital instructions over the USB or wireless interface, those instructions corresponding to a vibration to induce. Digital data representing a size of the vibration to be induced may be applied to a digital to analog converter (DAC), which may, in response, output and analog voltage over wires 403, 404. That analog voltage from the DAC (from the Piezo controller 410) may then cause the materials 401, 402 to vibrate. In this manner, the Piezo controller 410 may facilitate use of the piezoelectric device 400 as a haptic feedback component.

In the examples above, the USB or wireless interface communicates with a controller, such as one of the controllers 106 discussed above with respect to FIG. 1. When acting as a vibration sensor, the piezoelectric device 400 may output digital data to its corresponding controller 106, and that corresponding controller 106 may analyze the digital data to identify the presence of a gesture and, if a gesture is present, identify which gesture (e.g., translational movement, mouse click, knock). The corresponding controller 106 may be in communication with the chipset 102 and the processor 101 to signal the presence of a gesture (e.g., by an interrupt or other appropriate signaling).

In an example of providing haptic feedback, the respective controller 106 may detect an action that corresponds to a haptic response. An action that may correspond to haptic response may include, e.g., a mouse click on a button or other appropriate action. The respective controller 106 may then cause the materials 401, 402 to vibrate, thereby providing haptic feedback to a user whose hand is on the pointing device.

The scope of implementations is not limited to the exact configuration shown in FIGS. 1 and 4, as ADC functionality, DAC functionality, communication interface functionality, controller functionality, and gesture analyzing functionality may be performed by any appropriate component within IHS 100. For instance, a pointing device may be configured as an intelligent pointing device, having its own controller within the housing of the pointing device itself.

Of course, the scope of implementations may include any appropriate architecture or structure of the piezoelectric device, as piezoelectric device 400 is just one example.

Figure 5A:
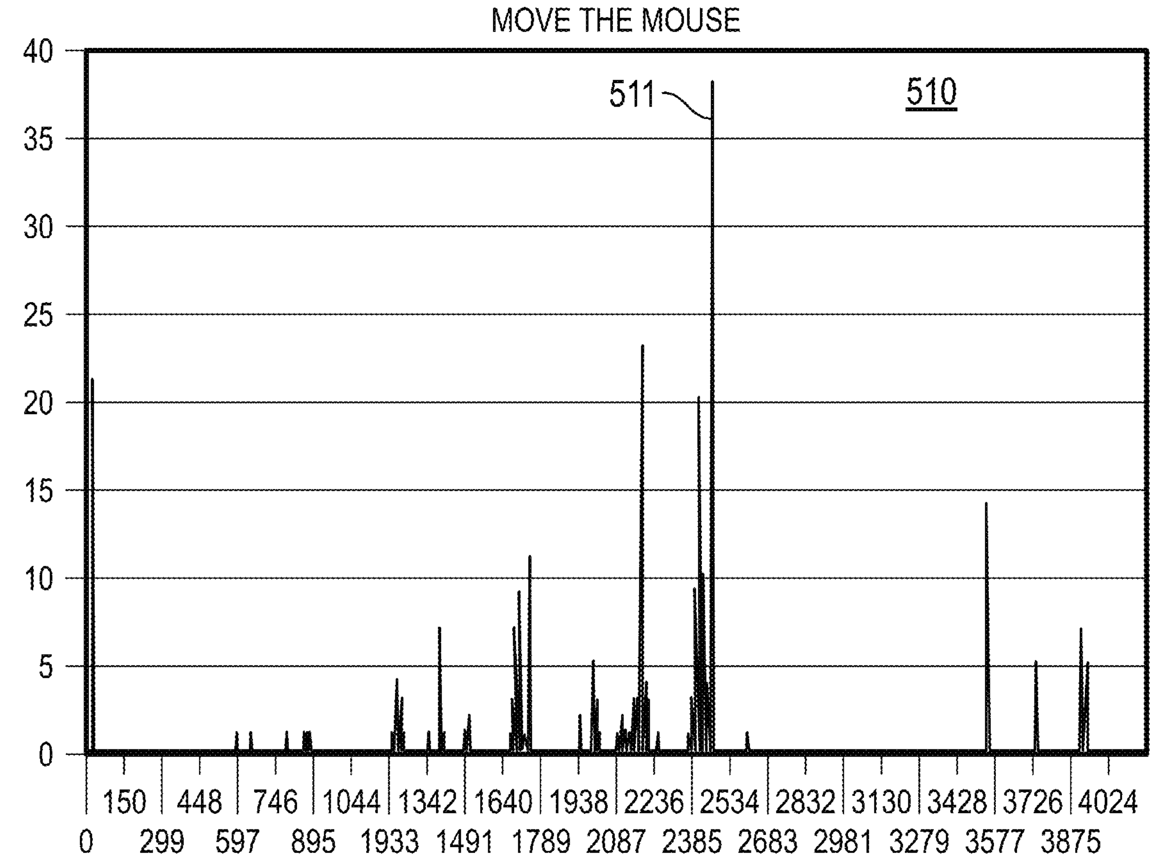
FIGS. 5A-B illustrate example graphs of digital output from a piezoelectric device, such as the piezoelectric device of FIG. 4, according to some embodiments.
Figure 5A:
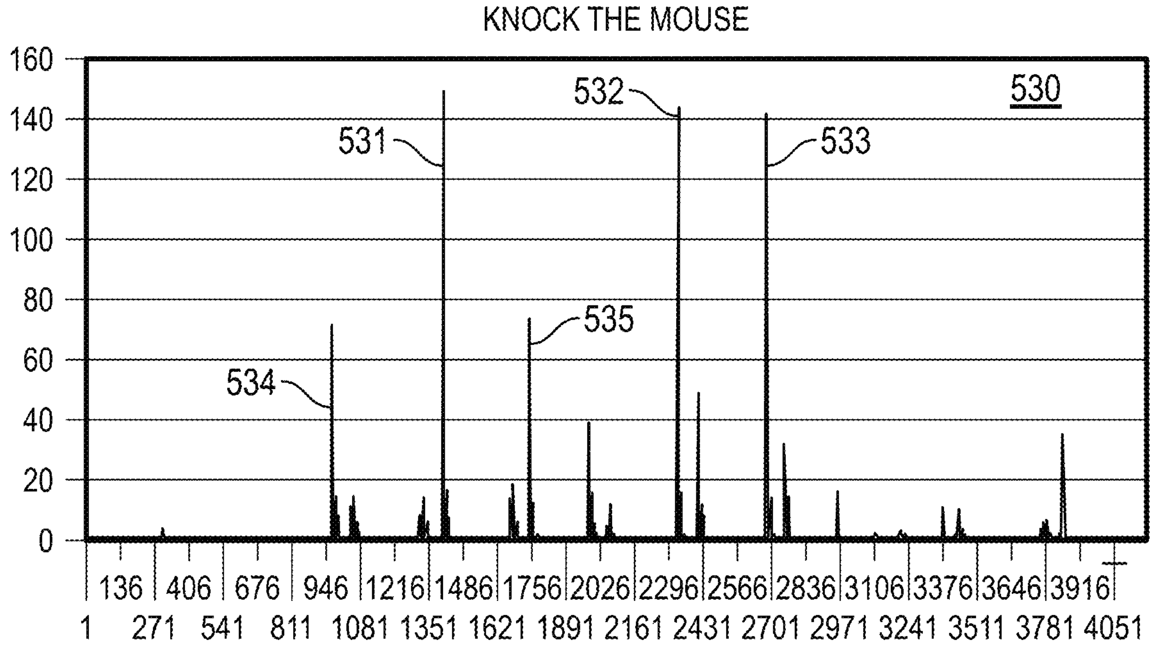
Figure 5B:
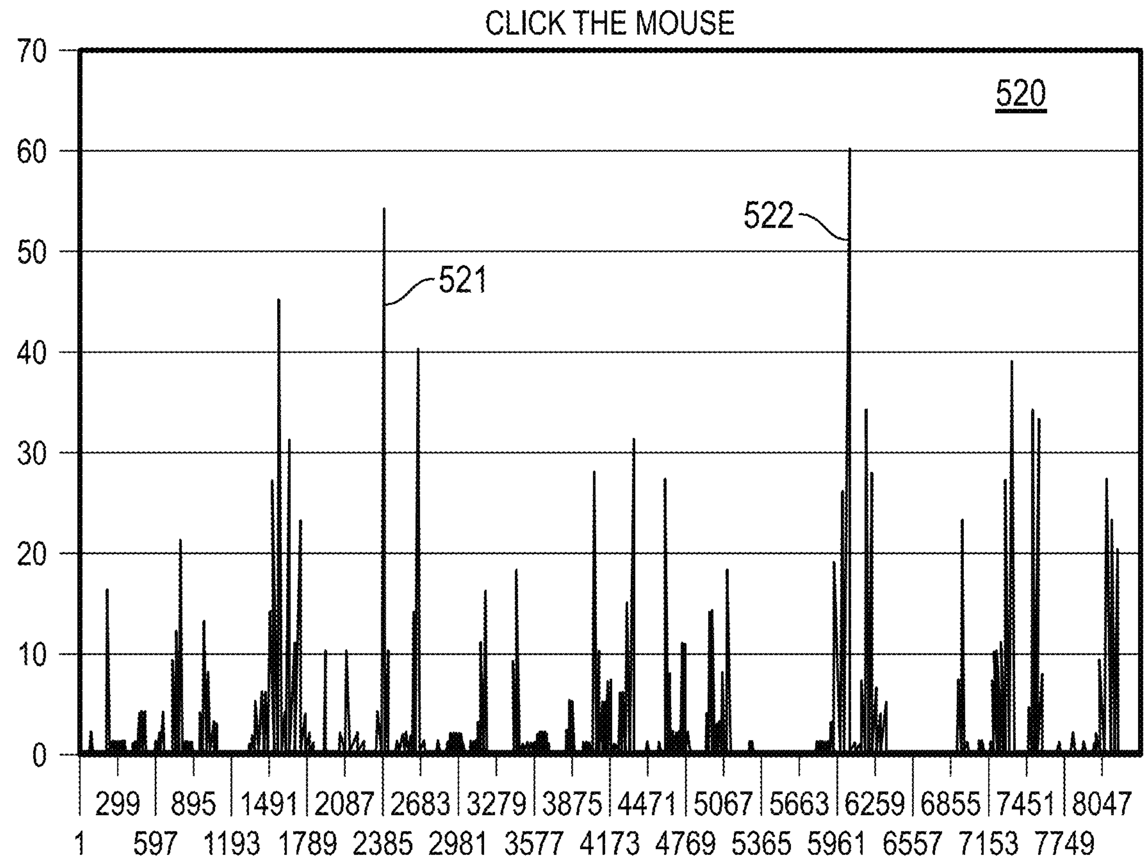

FIGS. 5A-B illustrate example graphs of digital output from a piezoelectric device, such as piezoelectric device 400, according to some embodiments. More specifically, the example graphs illustrate digital output of a piezoelectric device that may be expected from a mouse device. However, as noted above, the scope of implementations is not limited to a mouse device only, as piezoelectric devices may be implemented within other pointing devices.

For each of the graphs 510, 520, 530, the Y axis represents an encoding of a voltage level. For instance, the voltage level over wires 403, 404 may be expected to vary between 0 V and 5 V, and the encoding may be a linear encoding between the values 0-1023. Of course, the scope of embodiments may be associated with any appropriate voltage level and any appropriate encoding. For each of the graphs 510, 520, 530, the X axis represents a timestamp of the digital data received from the Piezo controller 410. For instance, the timestamps may be in milliseconds and range from 0 to 8047. However, the scope of implementations may include any appropriate time stamping.

Looking at graph 510, it illustrates translational movement of the mouse across a flat surface, without mouse clicks or knocking, according to one example. There is a single peak 511, and its amplitude is between 35 and 40 of the digital encoding. For instance, the translational movement of the mouse may include an abrupt stop to the movement, which may result in the peak 511. No peak in graph 511 registers above 40 in the particular voltage encoding.

Looking at graph 520, it illustrates clicking the mouse, as well as translational movement of the mouse, but excluding any knocking gestures, according to one example. Graph 520 illustrates two peaks 521, 522, that register above the encoding 50 for the voltage. More specifically, the peak 521 registers between 50 and 60, and peak 522 registers at approximately 60 in the particular voltage encoding. No peak in graph 520 registers above approximately 60. Those peaks 521, 522 are separated by approximately 3500 ms, according to the timestamps. In one example use case, each of the peaks 521, 522 represent piezoelectric output corresponding to two respective mouse clicks, with translational movement of the mouse across a flat surface during most of the time shown in graph 520.

Looking at graph 530, it illustrates a knock gesture, according to one example. Graph 530 shows three peaks 531-533, which register above 140 on the particular voltage encoding. As noted above, the encoding 0-1023 may be linear throughout the voltage range 0 V-5 V, so the peaks 531-533 are each more than twice the highest voltage value shown in graph 520 and more than three times the highest voltage value shown in graph 510. The peaks 531-533 occur within a time window of approximately 1350 ms, which is shorter than the time window of 3500 ms of the peaks 521, 522 of graph 520.

Graph 530 also includes smaller peaks 534, 535, which may be associated with the knock gesture or not. The peaks 534, 535 are less than half of the amplitude of the peaks 531-533.

In a use case example of graph 530, the peaks 531-533 may represent a single tap gesture on the mouse, where that tap gesture causes vibration in a piezoelectric device, resulting in a voltage that is encoded digitally. Various embodiments may include functionality in a respective controller 106 or other device that is configured to analyze digital output, such as illustrated in graphs 510, 520, 530 to recognize appropriate gestures. In one example, a respective controller 106 may be programmed to recognize a profile associated with a knock gesture. An example profile may be based on observed digital output, such as that illustrated in graph 530, where there may be a threshold quantity of peaks above a threshold voltage level and within a pre-configured time window. The example of graph 530 illustrates three peaks 531-533 all above 140 voltage units in the encoding and within an approximately 1350 ms time window. For instance, functionality may be programmed to recognize similar digital output and to flag it as a knock gesture and to ignore digital output that is more similar to either graphs 510 or 520.

Furthermore, analyzing the digital output and identifying a knock gesture may include excluding that the data may represent only some other gesture, such as translational movement or mouse clicks. In such an example use case, analyzing functionality may exclude peaks that are below a certain voltage level, may exclude time windows that do not include peaks above a certain voltage level, and/or the like.

One example embodiment may include training a machine learning (ML) model on digital output corresponding to different gestures. Once the model is trained, that trained model may be implemented in a component, such as a respective controller 106, to identify different gestures.

In some embodiments, the pointing device may include other functionality to recognize other gestures, such as button clicks, pen movement, translational movement, and the like. In other words, such functionality may be left unmodified in some implementations, where such implementations may further include a piezoelectric component used only for knock recognition. However, it is within the scope of embodiments to use a piezoelectric component to recognize any gesture, whether knocks or otherwise.

Additionally, various embodiments may be configured to recognize multiple knock gestures. Such embodiment may include observing profiles of multiple knock gestures and then implementing software or firmware functionality in a component to identify multiple knock gestures, either programmatically or through a trained ML model.

Figure 6:
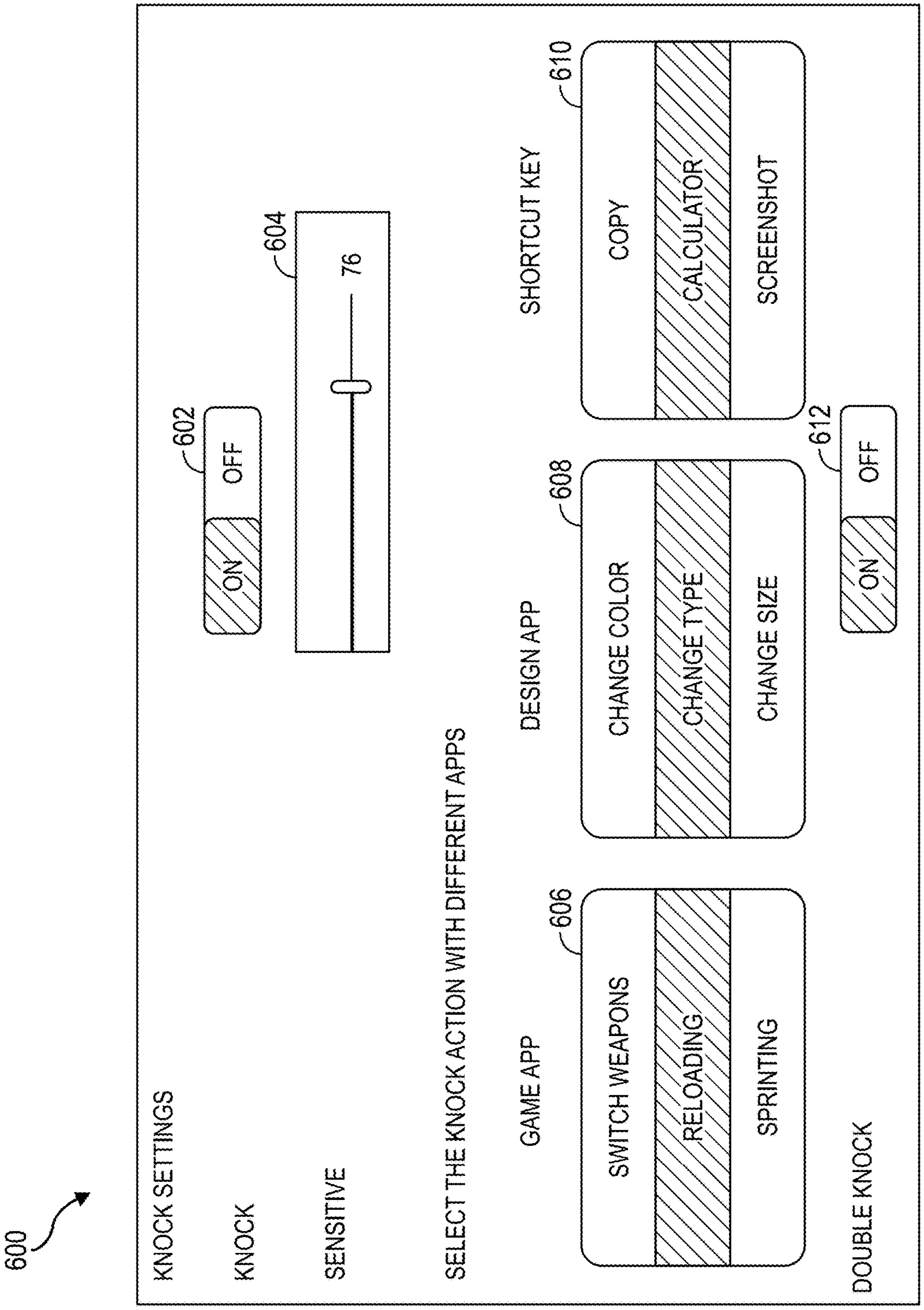
FIG. 6 is an illustration of an example knock settings window, which may be displayed using a graphical user interface on a display device, according to some embodiments.

FIG. 6 is an illustration of an example knock settings window 600, which may be displayed using a graphical user interface on a display device, such as display device 111 of FIG. 1, according to some embodiments. A human user may use knock settings window 600 to configure how an IHS may recognize knock gestures and react to those knock gestures.

Virtual switch 602 allows a user to configure whether the IHS recognizes knock gestures. For instance, the user may select on, which causes the IHS to recognize knock gestures and react to knock gestures, whereas selecting off may cause the IHS to ignore knock gestures.

Virtual slider 604 may allow a user to configure a sensitivity. For instance, some users may have different knock profiles, where some knock profiles may result in larger or smaller amplitude peaks (e.g., as in graph 530). A user may use trial and error or other appropriate method to determine an appropriate sensitivity setting that allows the user's knock gestures to be recognized.

Selection menu 606-610 allow a user to configure how the IHS may react to a knock gesture, such as by controlling or otherwise affecting output on a display screen. Menu 606 may allow a human user to determine how a game application reacts to a knock gesture, such as by switching weapons, reloading a weapon, or sprinting. Menu 608 may allow a human user to determine how a design application reacts to a knock gesture, such as by changing a color of a writing instrument on the display screen, changing a type of a writing instrument on a display screen, changing a size of a line drawing or a font or another object on the display screen in response to detecting a knock gesture. Menu 610 allows a user to associate shortcut keys with knock gestures. For instance, a user may program the IHS to perform a text copy or object copy operation, launch an application such as a calculator or other application, take a screenshot, or the like, in response to recognizing a knock gesture.

Virtual switch 612 allows the user to select whether the IHS recognizes double knock gestures or not. Of course, the scope of implementations is not limited to any knock settings, as the settings in the knock settings window 600 are examples. Rather, the scope of implementations may include any appropriate programming of an IHS to detect a knock gesture or multiple knock gestures and to perform any appropriate reaction, such as controlling an output on a GUI, in response to a knock gesture.

Figure 7:
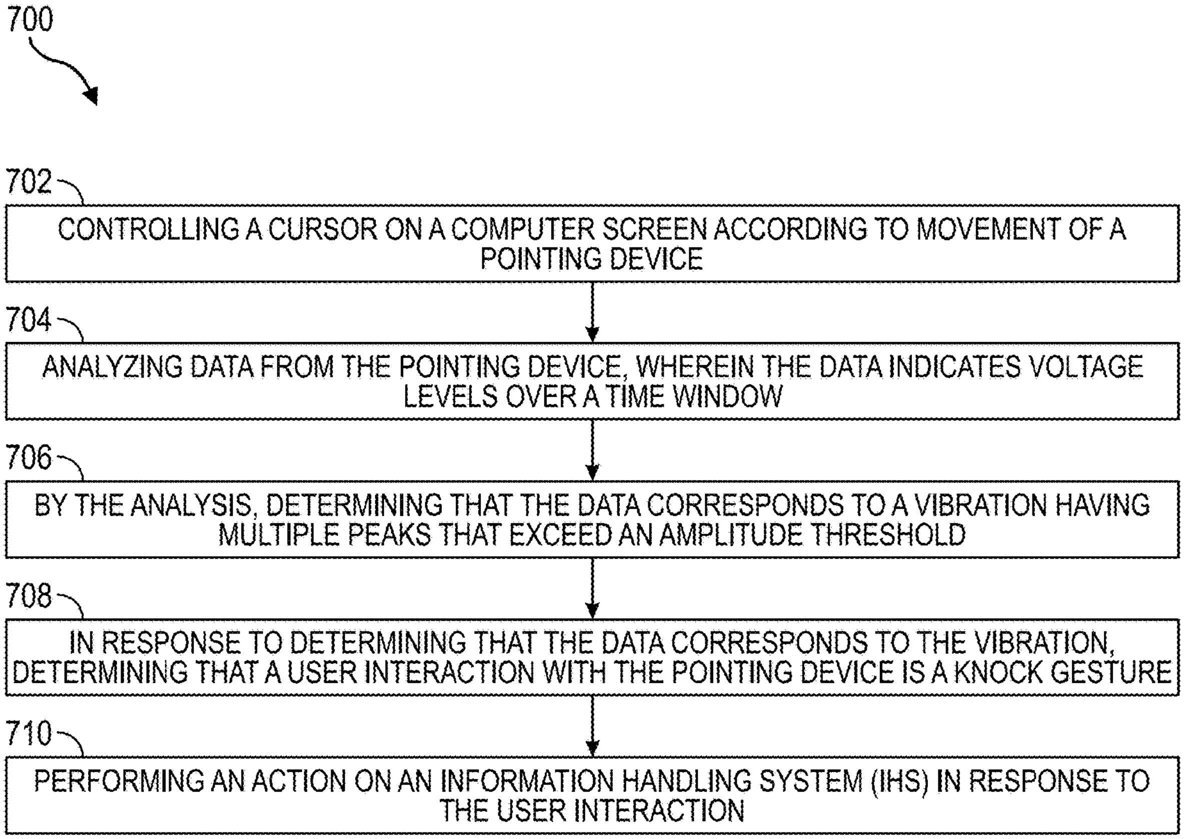
FIG. 7 illustrates an example method, according to some embodiments.

FIG. 7 illustrates an example method 700, according to some embodiments. The actions of method 700 may be performed, e.g., by an IHS that is communicatively coupled to a pointing device. An example of an IHS is described above with respect to FIG. 1. Example pointing devices may include a mouse, an active pen, a trackball device, a touchpad device, and/or the like. Furthermore, in an example method 700, the pointing device includes at least one piezoelectric device that is operable as a vibration sensor.

At action 702, the IHS controls a cursor on a computer screen (e.g., display device 111) according to movement of the pointing device. For instance, the cursor may include an arrow image, a hand image, and a blinking bar for text, and/or the like. The cursor may move around the screen according to translational movement using the pointing device. Furthermore, various gestures of the pointing device, such as a click, double-click, a knock, and/or other gestures may cause actions to be performed by the IHS on the computer screen.

At action 704, a component, such as a respective controller 106, analyzes data from the pointing device. The data indicates voltage levels over a time window. Examples of voltage levels and time windows are described above with respect to FIGS. 5A-B. Further in this example, the data may be derived from voltages produced by a piezoelectric device. For instance, in the example of FIG. 4, the Piezo controller 410 is configured to output data based on voltage levels sensed on wires 403, 404.

At action 706, it is determined, by the analysis of action 704, that the data corresponds to a vibration having multiple peaks that exceed an amplitude threshold. For instance, a threshold may be set at any appropriate voltage encoding. An example is shown at graph 530, where peaks above a voltage encoding of about 120 or 140 may be indicative of a knock gesture. However, as shown in FIG. 6, sensitivity may be adjusted, where that sensitivity may adjust the threshold higher or lower.

Action 706 may also include determining that the multiple peaks occur within the time window of action 704. In the example of graph 530, the peaks 531-533 occur within a time window of about 1350 ms. However, the scope of implementations may include any appropriate time window and any appropriate voltage threshold for peaks, where the elapsed time of the time window and the voltage threshold are operable to identify a knock gesture without an unacceptable number of false positives or false negatives.

At action 708, in response to determining that the data corresponds to the vibration, the respective controller 106 may determine that a user interaction with the pointing device is a knock gesture. Such determination is discussed above. For instance, the determination may be programmatically based on thresholds for time and voltage peaks. In another example, a trained ML model may be used to recognize knock gestures. The scope of implementations may include any appropriate technique to recognize knock gestures from piezoelectric device output.

At action 710, the IHS performs an action in response to the user interaction. For instance recognition of the knock gesture may cause an interrupt or other appropriate signal, where that interrupt or other appropriate signal may cause a processor to perform an appropriate action. Actions that may be taken in response to recognizing a knock gesture are described above, with respect to FIG. 6. Example actions may include operations in a gaming application, operations and the design application, operations in a word processing application, launching an application, copying and/or pasting, and/or the like. In fact, an IHS may be programmed to perform any appropriate action in response to recognizing a knock gesture.

The scope of implementations is not limited only to the actions 702-710 of FIG. 7. Rather, various embodiments may add, omit, rearrange, or modify ones of the actions. In one example, the method 700 may further include providing haptic feedback in response to some condition of the IHS. For instance, an incorrect password entry may result in haptic feedback, a mouse click may result in haptic feedback, and/or the like. In some implementations, haptic feedback may be programmed to facilitate accessibility for users who may have a sensory impairment. The scope of implementations may include any appropriate haptic feedback.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method comprising:

displaying a settings window on a computer screen, wherein the settings window allows for instructing a computer to either recognize or not recognize a knock gesture, wherein the knock gesture comprises a human user applying a singular stroke of force to a housing of a pointing device, wherein the singular stroke of force is greater in energy than is associated with a click gesture of the pointing device or translational movement of the pointing device;

receiving user input, with respect to the settings window, wherein the user input instructs the computer to recognize the knock gesture;

controlling a cursor on the computer screen according to movement of a pointing device;

analyzing data from the pointing device, wherein the data indicates voltage levels over a time window;

by the analysis, determining that the data corresponds to a vibration having multiple peaks that exceed an amplitude threshold;

in response to determining that the data corresponds to the vibration, determining that a user interaction with the pointing device is the knock gesture; and performing an action on an information handling system (IHS) in response to the user interaction.

2. The method of claim 1, wherein the pointing device comprises a mouse.

3. The method of claim 1, wherein the pointing device comprises a touchpad.

4. The method of claim 1, wherein the pointing device comprises an active pen.

5. The method of claim 1, wherein the action comprises launching an application according to a pre-configured setting of the IHS.

6. The method of claim 1, further comprising:

providing further data to a device responsible for the vibration, thereby causing the device to provide haptic feedback to a user in contact with the device.

7. The method of claim 1, further comprising:

generating the data by digitizing a voltage level received during the time window from a piezoelectric device.

8. The method of claim 1, wherein determining that the user interaction with the pointing device is a knock gesture comprises: determining that that the digital output excludes a click or a translational movement of the pointing device.

9. The method of claim 1, wherein the action comprises changing a color of an on-screen drawing control.

10. The method of claim 1, wherein determining that the data corresponds to the vibration comprises:

identifying the multiple peaks that exceed the amplitude threshold; and determining that a quantity of the multiple peaks meets or exceeds a quantity threshold.

11. The method of claim 10, further comprising:

identifying the knock gesture as a single knock.

12. The method of claim 10, further comprising:

identifying the knock gesture as a double knock.

13. The method of claim 1, wherein a knock gesture comprises a human user applying a singular stroke of force to a housing of the pointing device, wherein the singular stroke of force is greater in energy than is associated with a click gesture of the pointing device or translational movement of the pointing device.

14. An Information Handling System (IHS), comprising:

a processor; and a memory coupled to the processor, the memory having program instructions stored thereon that, upon execution by the processor, cause the IHS to:

display a settings window on a display screen, wherein the settings window allows for instructing the IHS to either recognize or not recognize a knock gesture, wherein the knock gesture comprises a human user applying a singular stroke of force to a housing of a pointing device, wherein the singular stroke of force is greater in energy than is associated with a click gesture of the pointing device or translational movement of the pointing device;

receive user input, with respect to the settings window, wherein the user input instructs the IHS to recognize the knock gesture;

translate data from a piezoelectric device into an indication of a user gesture with the pointing device, wherein the data provides an indication of a voltage level over a time range, and wherein the user gesture includes the knock gesture; and perform an action on a display screen of the IHS in response to the user gesture.

15. The IHS of claim 14, further comprising program instructions to cause the IHS to:

exclude a clicking gesture and a translational movement gesture based on the data.

16. The IHS of claim 14, wherein the program instructions to cause the IHS to translate the data into an indication of the user gesture comprises program instructions to:

determine that the data includes at least a threshold quantity of voltage peaks above a threshold voltage level and within the time range.

17. The IHS of claim 14, wherein the pointing device comprises a mouse, a touchpad, or an active pen.

18. A hardware memory device having program instructions stored thereon that, upon execution by a processor of an Information Handling System (IHS), cause the IHS to:

display a settings window on a display screen, wherein the settings window allows for instructing the IHS to either recognize or not recognize a knock gesture, wherein the knock gesture comprises a human user applying a singular stroke of force to a housing of a pointing device, wherein the singular stroke of force is greater in energy than is associated with a click gesture of the pointing device or translational movement of the pointing device;

receive user input, with respect to the settings window, wherein the user input instructs the IHS to recognize the knock gesture;

detect the knock gesture based on data from a piezoelectric device incorporated into the pointing device, including determining the user knock gesture from an indication of voltage levels over a time window in the data; and control a graphical user interface in response to the user knock gesture.

19. The hardware memory device of claim 18, wherein the program instructions to cause the IHS to determine the knock gesture comprises program instructions to cause the IHS to: exclude a mouse click and translational movement of a mouse based on the data.

20. The hardware memory device of claim 18, wherein the program instructions to cause the IHS to control the display on the graphical user interface comprises program instructions to cause the IHS to:

launch an application or change a drawing characteristic.

* * * * *